United States Patent [19]

Schultz

[11] Patent Number: 5,348,187
[45] Date of Patent: Sep. 20, 1994

[54] DOUBLE-WALLED COOKING POT

[75] Inventor: Horst Schultz, Massenheim, Fed. Rep. of Germany

[73] Assignee: ALFA Institut fur hauswirtschaftliche Produkt- and Verfahrens-Entwicklung GmbH, Eltville am Rhein, Fed. Rep. of Germany

[21] Appl. No.: 513,088

[22] Filed: Apr. 23, 1990

[30] Foreign Application Priority Data

Apr. 26, 1989 [DE] Fed. Rep. of Germany ....... 3913707

[51] Int. Cl.$^5$ ............................................. B65D 25/28
[52] U.S. Cl. ................................. 220/752; 220/912; 99/403; 126/373; D7/354; D7/361
[58] Field of Search .................. 99/403, 417, 426, 449, 99/340, 339; 126/373, 378, 390; 220/23.83, 23.86, 94 R, 95, 420–422, 425–427, 431, 669, 912, 212, 379, 322, 4.01, 4.02, 469, 626, 752; D7/327, 354, 356, 361, 540; 16/110.5, 110 A, 114 A

[56] References Cited

U.S. PATENT DOCUMENTS

| D. 59,192 | 10/1921 | Church | D7/356 |
| 271,744 | 2/1883 | Schifferle | 126/390 |
| 282,844 | 8/1883 | Cherry | 220/431 X |
| D. 284,160 | 6/1986 | Durand | D7/540 X |
| 397,163 | 2/1889 | Zinsser, Jr. | 220/669 X |
| 942,111 | 12/1909 | Speirs | 126/390 X |
| 1,496,600 | 6/1924 | Rau | 220/94 R |
| 1,509,697 | 9/1924 | Allison | 126/378 |
| 1,774,851 | 1/1930 | Wilson | 16/110 A |
| 2,431,193 | 11/1947 | Nielsen . | |
| 2,588,494 | 3/1952 | Deuel | 99/426 |
| 2,607,509 | 8/1952 | Hess | 220/95 X |
| 2,719,480 | 10/1955 | Prickett et al. | 99/426 |
| 3,641,920 | 2/1972 | Kraft et al. | 99/340 |
| 3,934,748 | 1/1976 | Racz | 220/94 R |
| 4,258,695 | 3/1981 | McCarton et al. | 126/390 X |
| 4,595,120 | 6/1986 | Logan et al. | 220/626 X |
| 4,595,437 | 6/1986 | Yamamoto | 220/469 X |

FOREIGN PATENT DOCUMENTS

| 0222699 | 5/1987 | European Pat. Off. . | |
| 863991 | 12/1952 | Fed. Rep. of Germany . | |
| 3339848 | 5/1985 | Fed. Rep. of Germany . | |
| 683617 | 6/1930 | France . | |
| 1409808 | 7/1965 | France . | |
| 2437184 | 4/1980 | France . | |
| 625685 | 9/1978 | U.S.S.R. | 99/340 |
| 8001483 | 7/1980 | World Int. Prop. O. | 220/469 |
| 8401357 | 4/1984 | World Int. Prop. O. | 220/426 |
| 8803379 | 5/1988 | World Int. Prop. O. | 220/469 |

Primary Examiner—Timothy F. Simone
Assistant Examiner—C. Cooley
Attorney, Agent, or Firm—Wenderoth, Lind & Ponack

[57] ABSTRACT

The invention is drawn to a double-walled cooking pot having an outer pot, and an inner pot arranged in said outer pot and having a side wall defining a continuous inner surface to receive the product to be cooked. The side walls of the outer pot and inner pot are connected to one another at their bottom portions by a bottom plate made of thermally conductive material and at their upper portions in a manner which forms a discharge rim. To provide a double-walled cooking pot in which it is possible to fasten rapidly and reliably the handle(s) to the side wall of the outer pot, it is provided in essence that the outer pot has a portion that is spaced from the inner pot; and, between the upper and bottom portions at which the inner and outer pots are connected, the side walls of the inner pot and the outer pot make only point or line contact with one another.

21 Claims, 5 Drawing Sheets

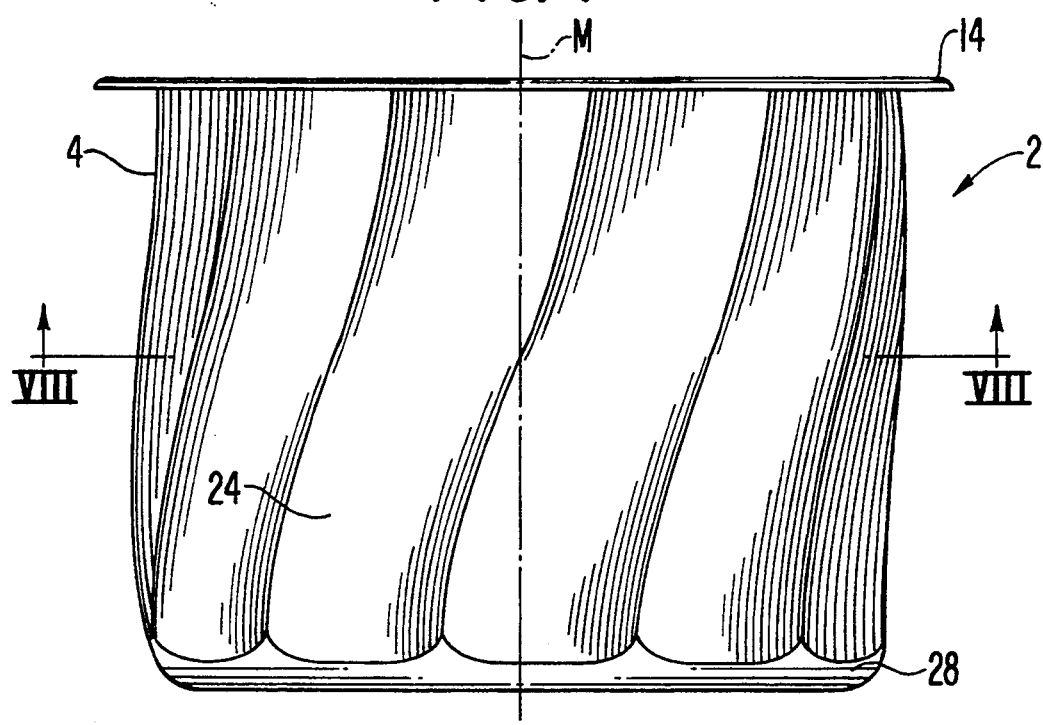
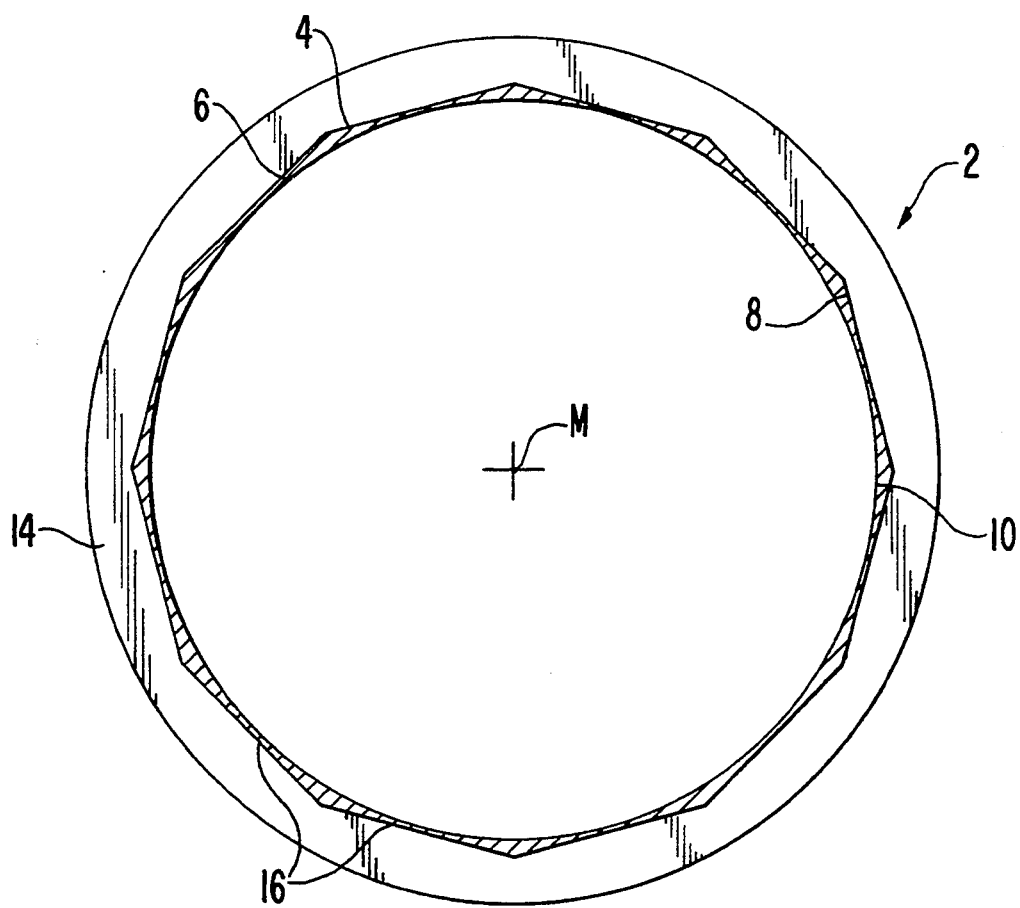

DOUBLE-WALLED COOKING POT

BACKGROUND OF THE INVENTION

The invention relates to a double-walled cooking pot having an outer pot, and an inner pot arranged therein and having a side wall defining a continuous inner side surface to receive the product to be cooked. The side walls of the outer pot and inner pot are connected to one another at their bottom portions by means of a bottom plate made of thermally conductive material and at their upper portions in a manner which forms a discharge rim.

Known double-walled cooking pots of this kind offer good thermal insulation for the product to be cooked when cooking and finishing due to the cavity formed between the inner and outer pots. However, the drawback with such double-walled cooking pots is that the handle(s) of the pot cannot be attached or can be attached only with difficulty to the side wall of the outer pot. The pot handles are mounted generally by means of spot welding, which, however, on a double-walled cooking pot is possible only by inserting additional parts due to the cavity between the outer pot and the inner pot. Adhesive connections between a handle and the side wall of the outer pot are not suitable for an adequate fastening. Independently of the kind of fastening, the fastening of the handle to the side wall of the outer pot assumed that the wall material is sufficiently strong. Occasionally the discharge rim of a double-walled pot is designed somewhat wider in order to be able to weld the handle thereon. However, this leads to a relatively high and, therefore, undesired position of the handle in the immediate vicinity of where the steam exits between pot and cover.

SUMMARY OF THE INVENTION

The object of the invention is to provide a double-walled cooking pot of the aforementioned kind in which it is possible to fasten rapidly and reliably the handle(s) to the side wall of the outer pot by, for example, means of spot welding.

This problem is solved in essence by the invention in that the outer pot has a side wall that is spaced at a portion thereof from the inner pot; and, between the upper and bottom portions at which the inner and outer pots are connected, the side walls of the inner pot and outer pot make only point or line contact with one another. It is clear that what is meant here are not the precise geometrical concepts of point and line but, rather that the contact surfaces shall be as small or as narrow as possible in order to detract as little as possible from the thermal insulation. In the region of the point or line contact of the side walls of the outer pot and the inner pot, the handles can be spot welded in a simple manner without any problems, to which end the distribution of such point or line contact regions is adapted to the dimension of the handles or vice versa. In the double-walled cooking pot of the invention, the space between the side walls of the inner and outer pots is formed between the point or line contact regions, thus retaining in a satisfactory manner the good thermal insulation of the product to be cooked when cooking. In addition, due to the mutual reinforcement, the wall material of the inner pot and the outer pot can be thinner than in the conventional double-walled cooking pots. Since the inner pot retains a continuous inner surface, thus remaining smooth-walled, the inner pot can be readily cleaned.

In a preferred embodiment of the invention the inner pot has a round or oval cross section, as seen from a horizontal sectional view.

In another preferred embodiment of the invention, the outer pot has a polygonal cross section or defines recesses, as seen from a horizontal sectional view. In such a design the inner pot is reinforced by resting against the inner surface of the polygonal side wall or the inner surface corresponding to the recesses of the outer pot. Besides the reinforcement and fastening options for the handles it is also ensured that air escaping during the pressure welding process, when the outer pot and the inner pot are connected at their bottom portions, is drawn off reliably by means of discharge channels formed by the polygon or the recesses. In addition to these engineering advantages, an outer pot designed with recesses or as polygonal, as seen from a horizontal sectional view, gives the shape of the pot a new and impressive look.

In another embodiment according to the invention, the side wall of the outer pot has a regular polygonal cross section or has a regular circumferential distribution of recesses. In this manner the inner pot is reinforced at regular intervals by resting against the inner surface of the polygonal sidewall or the inner surface corresponding to the recesses. Due to the regular circumferential distribution of the recesses or the regular polygonal cross section, the inner pot is centered in the outer pot just by inserting into said outer pot. In addition, this design gives the cooking pot an especially impressive look.

The outer pot and the inner pot are expediently arranged coaxially so that when a person uses the double-walled cooking pot, the position of the inner pot can always be discerned due to the position of the outer pot, for example, on a stove or cooking plate.

In another preferred embodiment of the invention, the lines of contact between the outer pot and the inner pot are disposed parallel to the central axis of the pot or helically thereto. Other configurations of the lines of contact are possible and serve various shapes of the outer pot and thus of the double-walled cooking pot. If only points of contact are provided, they can be arranged to lie on similar lines.

Preferably the lines of contact run over almost the entire height of the inner pot and the outer pot, resulting in a reinforcement over almost the entire height; and the level at which the handles are attached can be chosen arbitrarily over the entire side wall of the outer pot, depending on the fabrication series and the desired design. Even the points of contact can be distributed linearly over substantially the entire height of the cooking pot.

In order to conduct the spot welding at as many points on the cooking pot of the invention as possible, resulting in a uniform reinforcement, yet detract as little as possible from the thermal insulation, it is expedient to distribute the points or lines of contact somewhat uniformly over the circumference of the cooking pot.

In an embodiment of the cooking pot according to the invention that is especially aesthetic, the outer pot and the inner pot are made of different materials. Thus, for example, the inner pot can be made of steel, the outer pot of copper.

Preferably the bottom portions of the outer pot and the inner pot are pressure welded to one another by means of a bottom plate made of material that conducts heat well. In this manner good thermal distribution is guaranteed with the heat transfer from the cooking or stove plate to the product to be cooked.

Furthermore, the discharge rim can be formed by the wall of the inner pot and can sealingly extend over the upper edge of the side wall of the outer pot. Thus, the liquid is prevented in a simple manner from penetrating in an unwanted manner into the space between the inner pot and the outer pot.

BRIEF DESCRIPTION OF THE DRAWINGS

FIG. 7 is a side view of another embodiment of a double-walled cooking pot according to the present invention.

FIG. 8 is a sectional view of the double-walled cooking pot taken along line 8—8 of FIG. 7.

DETAILED DESCRIPTION OF THE PREFERRED EMBODIMENTS

Figure 1:
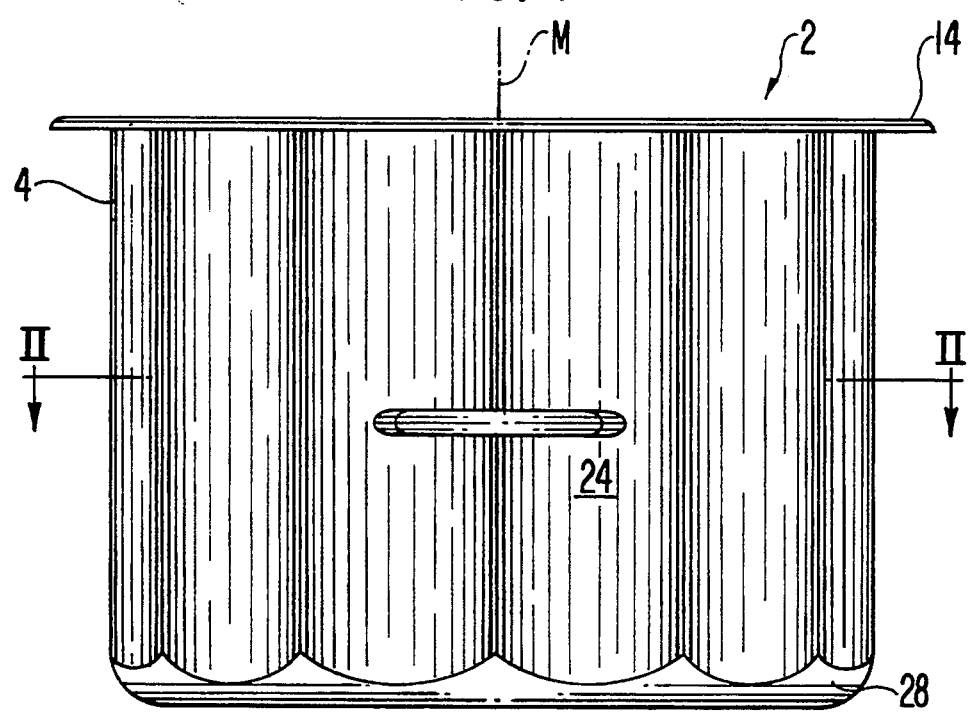
FIG. 1 is a side view of a double-walled cooking pot according to the present invention in which the outer pot has a polygonal cross section.

The double-walled cooking pot 2, illustrated in the drawings, has an outer pot 4, in which is arranged an inner pot 6. The inner pot 6 has a round shape, as seen from the sectional views; yet it can also be oval or elliptical. Outer pot 4 and inner pot 6 are arranged coaxially to one another. The bottom portions 20, 22 of the outer pot 4 and the inner pot 6 are pressure welded together by means of a bottom plate 12 made of a heat conductive material such as aluminum. The discharge rim 14 of the cooking pot 2 is formed by an extension of the side wall 10 of the inner pot 6 and rests sealingly on the upper edge of the side wall 8 of the outer pot 4. In this case, the discharge rim 14 horizontally seals the space formed between the inner pot 6 and the outer pot 4. Outer pot 4 and inner pot 6 are made preferably of steel. They can also be made of other materials such as copper and the like or can also be coated differently inside and/or outside. Due to the recesses 18 or the polygonal design of the outer pot 4, lines of contact are formed along the side walls 8, 10 with the inner pot 6 arranged in the outer pot 4. These lines of contact 16 run practically over the entire height of the cooking pot, i.e. of the side walls of the inner pot 6 and the outer pot 4. To facilitate good reinforcement, the lines of contact 16 are distributed somewhat uniformly over the circumference of the outer pot 4 and the inner pot 6. However, fewer lines of contact 16 suffice to fasten the handles by means of spot welding. For a stylistic handle, even only one line or even only one point of contact is adequate. In the case of an ear handle 5, the lines of contact or points of contact have a peripheral spacing that corresponds to the length of the handle(s) to be fastened.

Figure 2:
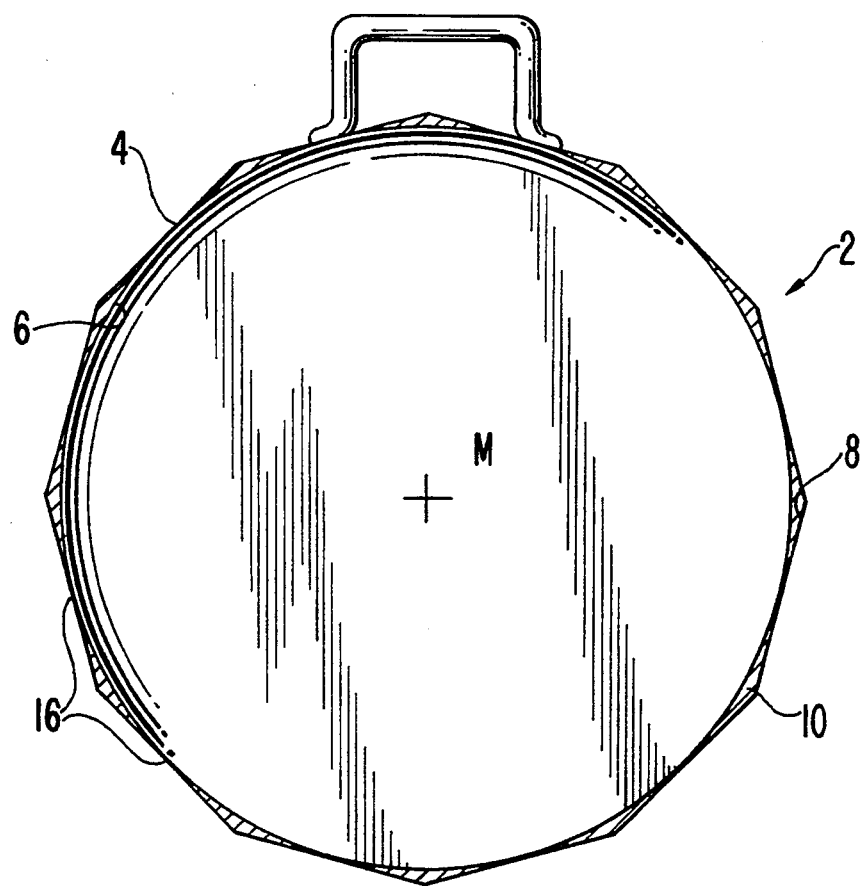
FIG. 2 is a sectional view of the double-walled cooking pot taken along line 2—2 of FIG. 1.

The double-walled cooking pot of the invention, shown in FIGS. 1 and 2, has a polygonal outer pot 4 in which the round inner pot 6 is arranged concentrically, i.e. the central axis M of the outer pot 4 and of the inner pot 6 coincide whereby the pots are disposed coaxially. The transition of the strips 24, formed by the polygonal sides, into the bottom region of the outer pot 4 exhibits a relatively large radius. In total the outer pot 4 has twelve sides and thus has a dodecagonal cross section.

Figure 3:
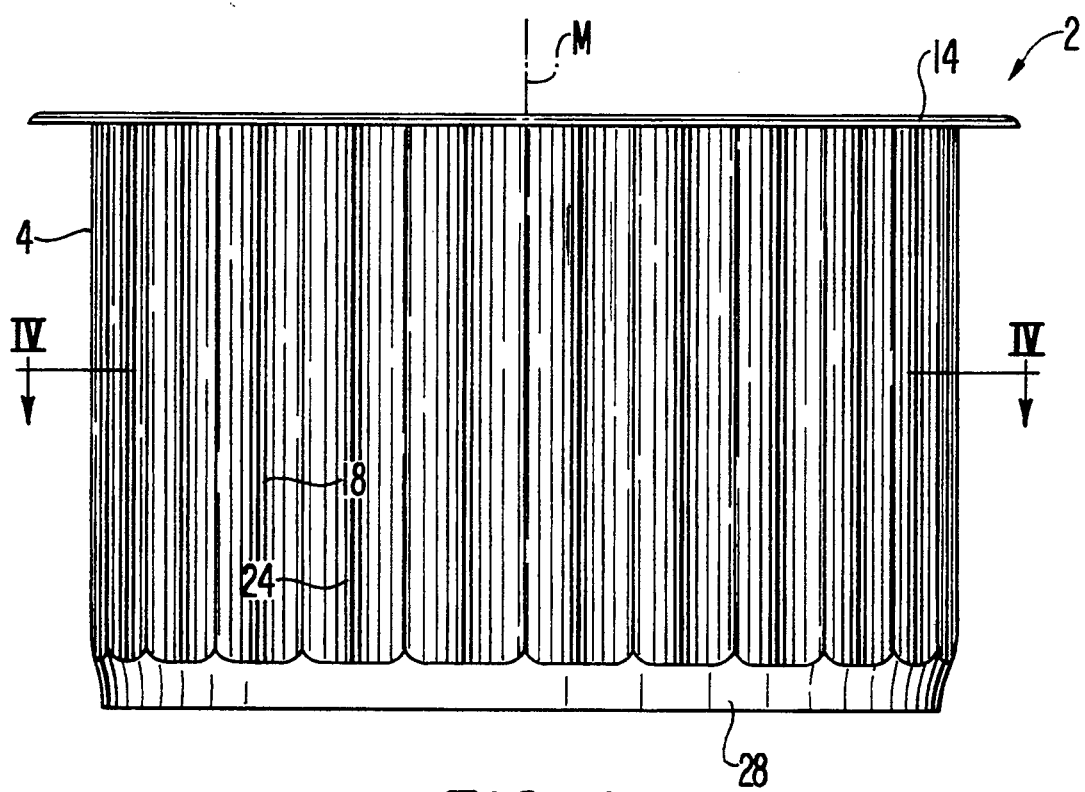
FIG. 3 is a side view of another embodiment of a double-walled cooking pot according to the present invention.
Figure 4:
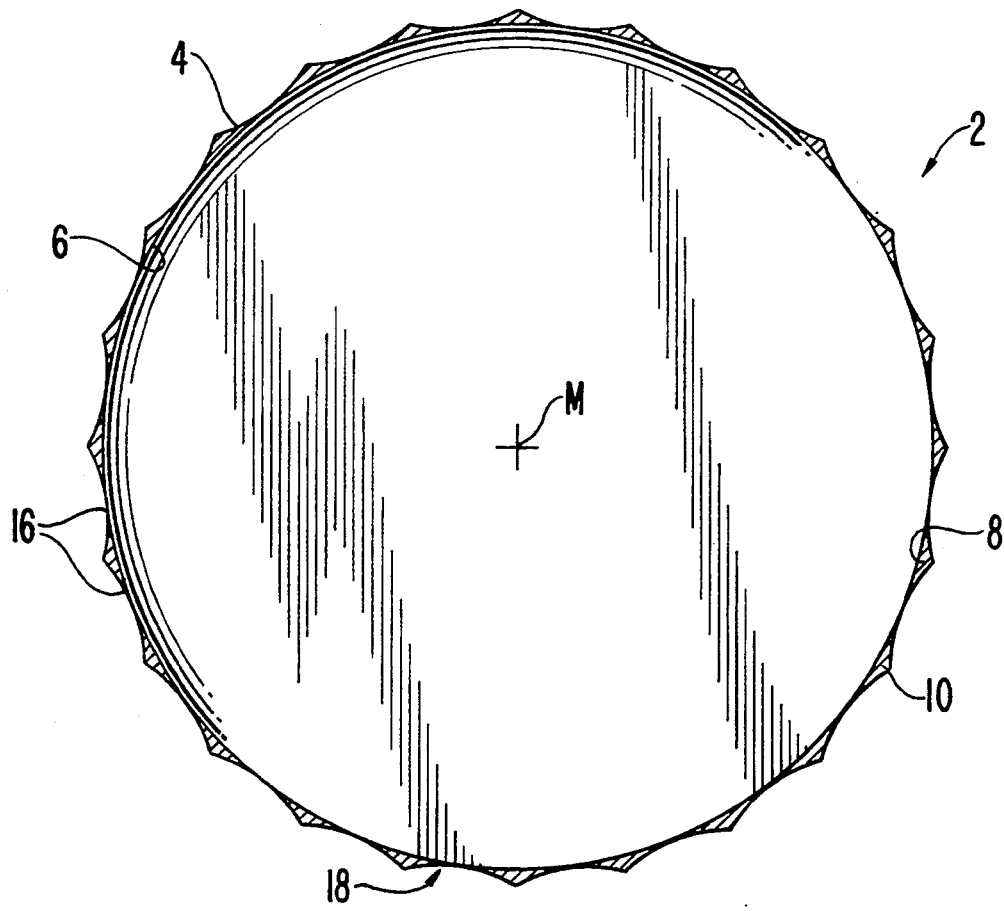
FIG. 4 is a sectional view of the cooking pot taken along line 4—4 of FIG. 3.

The double-walled cooking pot 2, shown in FIGS. 3 and 4, has an outer pot 4 with twenty-four recesses 18 directly adjoining one another. The recesses 18 are circular in section, wherein the convex surfaces corresponding to the recesses 18 point toward the inner pot 6. Associated with the twenty-four recesses, which the illustrated cooking pot 2 defines, are twenty-four parallel lines of contact 16 between the side wall 8 of the outer pot 4 and the side wall 10 of the inner pot 6. The individual strips 24 forming the recesses 18 in the outer pot 4 are drawn approximately as far as the bottom region 28 on a level with the bottom plate 12 and terminate there in one horizontal plane.

Figure 5:
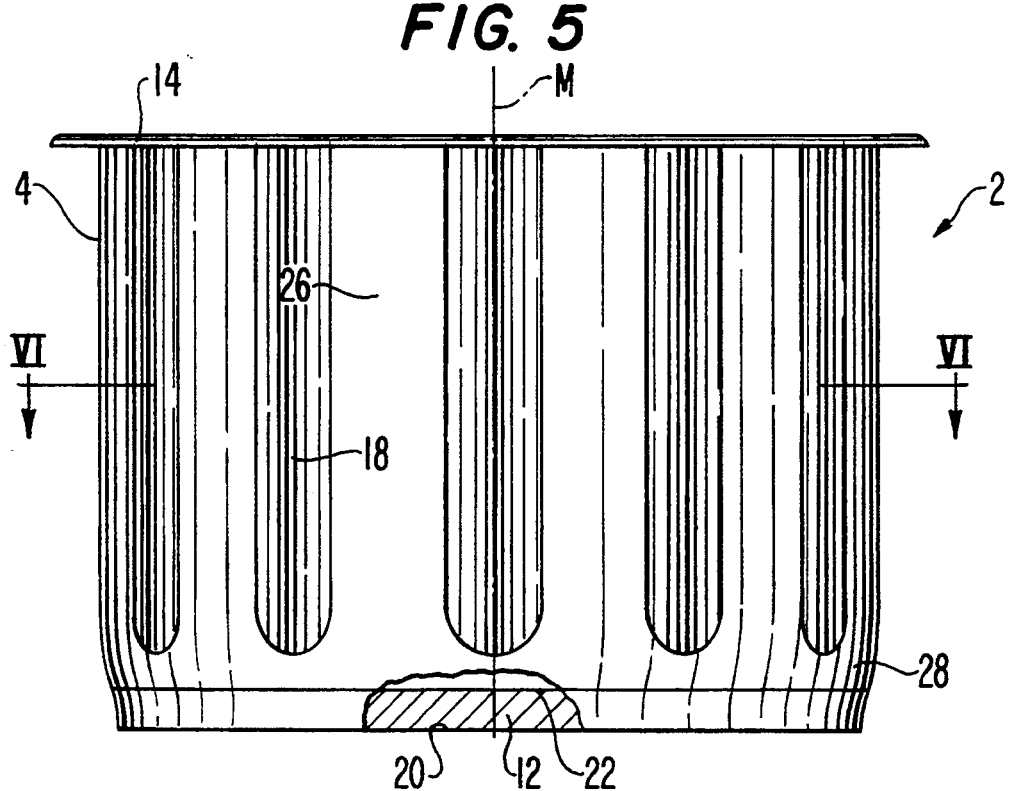
FIG. 5 is a side view of another embodiment of a double-walled cooking pot according to the present invention, partially broken away.
Figure 6:
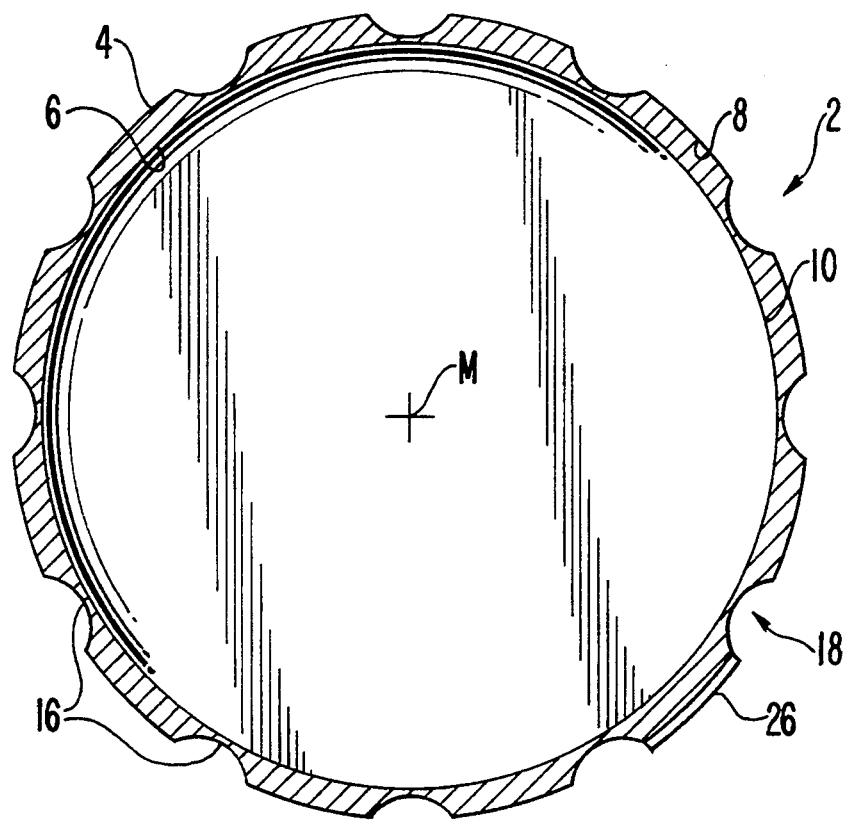
FIG. 6 is a sectional view of the cooking pot taken along line 6—6 of FIG. 5.

The cooking pot 2, shown in FIGS. 5 and 6, has flute-type recesses 18 spaced at peripheral intervals from one another. The longitudinal axes of the flute-type recesses 18 of the outer pot 4 also extend parallel to the central axis M of the pot. The outer pot 4 is provided with twelve recesses 18, which are associated with to the twelve lines of contact 16 of the side walls 8, 10. Between the recesses 18 remain regions 26 that correspond in their width somewhat to the width of the recesses 18 and at which regions the side walls of the outer pot 4 and the inner pot 6 remain spaced from one another. The strips, formed by the recesses 18, terminate adjacent the bottom with a smaller radius than in FIG. 1.

The double-walled cooking pot 2 of FIGS. 7 and 8 has a polygonally sectioned outer pot 4, as seen particularly from FIG. 8. Of course, here the lines of contact 16 between the side walls 8 and 10 of the outer pot 4 and the inner pot 6 run somewhat helically about the central axis M of the pot. The helical strips 24, formed by the polygonal shape, project with a relatively flat terminal portion into the bottom region 28 of the outer pot 4. As apparent from FIG. 8, the outer rim region of the discharge rim 14 is drawn somewhat downward.

Figure 9:
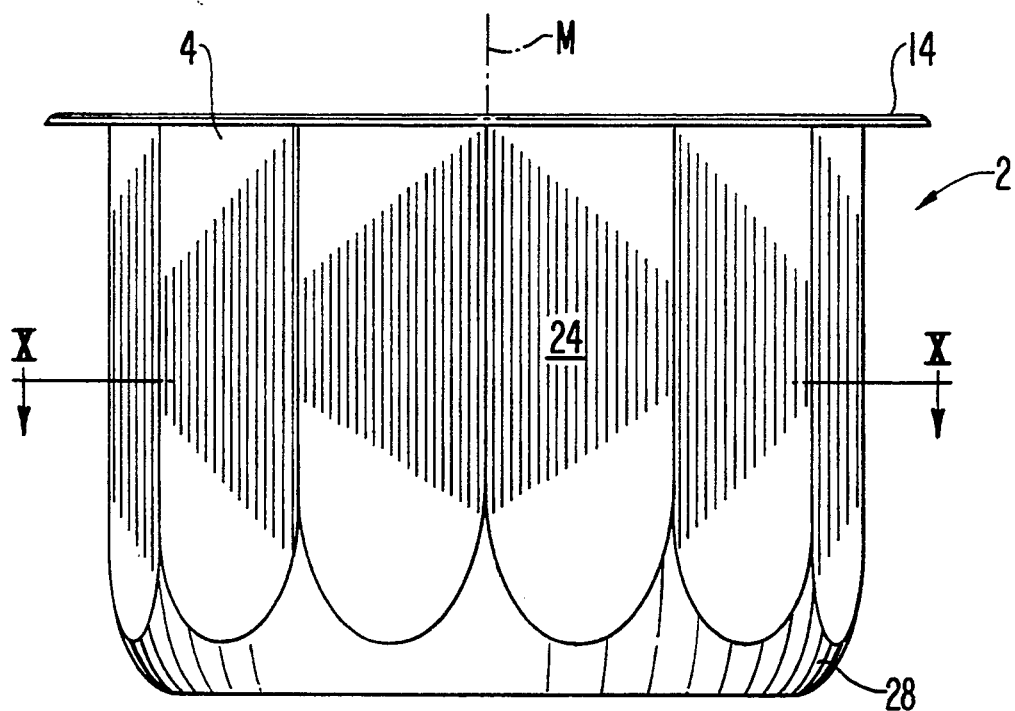
FIG. 9 is a side view of still another embodiment of a cooking pot according to the present invention.
Figure 10:
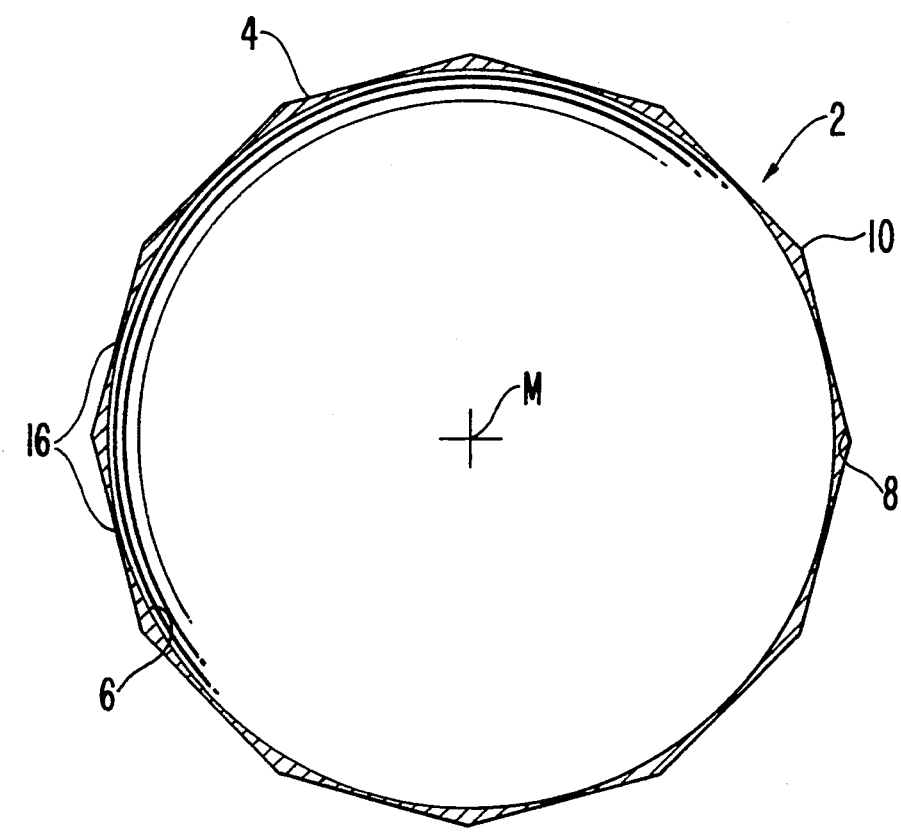
FIG. 10 is a view of the double-walled cooking pot taken along line 10—10 of FIG. 9.

FIGS. 9 and 10 show a double-walled cooking pot 2 with the outer pot 4 also having a polygonal cross section. This cooking pot 2 corresponds in essence to that of FIGS. 1 and 2, but the strips 24 terminate at their bottom end with only a small radius.

The foregoing description of the embodiments yields, with reference to the attached drawings, other objects, features, advantages and possible applications. All of the described and/or illustrated features form by themselves or in any arbitrary logical combination the subject matter of the present invention, even independently of their summary or their detailed description.

What is claimed is:

1. A double-walled cooking pot comprising:
   an outer pot having a side wall defining an outer side surface of the cooking pot, a bottom portion and an upper portion;
   an inner pot disposed within said outer port, said inner pot having a side wall defining a continuous inner side surface of the cooking pot, a bottom portion and an upper portion;

a bottom plate of thermally conductive material connecting said inner pot to said outer pot at the bottom portions thereof;

a discharge rim connecting said inner pot to said outer pot at the upper portions thereof;

the side wall of said outer pot having a portion thereof spaced from the side wall of said inner pot so as to define an enclosed insulating space therebetween facilitating thermal insulation of the side wall of said outer pot and the side wall of said inner pot;

at least one handle being fastened to the side wall of said outer pot; and wherein between the bottom and the upper portions of said inner and said outer pots, the side walls of said inner and said outer pots making only point or line contact with one another, and wherein said at least one handle is fastened to the side wall of said outer pot directly at a location or locations thereon at which the side walls of said inner and said outer pots make only point or line contact with one another.

2. The double-walled cooking pot as claimed in claim 1, wherein the side wall of said inner pot has a round or oval cross section.

3. The double-walled cooking pot as claimed in claim 2, wherein the side wall of said outer pot has a polygonal cross section.

4. The double-walled cooking pot as claimed in claim 3, wherein the cross section is a regular polygon.

5. The double-walled cooking pot as claimed in claim 2, wherein the side wall of said outer pot defines a plurality of recesses in the outer side surface of the cooking pot.

6. The double-walled cooking pot as claimed in claim 5, wherein said recesses are spaced equally about the circumference of the side wall of the inner pot.

7. The double-walled cooking pot as claimed in claim 1, wherein the side wall of said outer pot has a polygonal cross section.

8. The double-walled cooking pot as claimed in claim 7, wherein the cross section is a regular polygon.

9. The double-walled cooking pot as claimed in claim 1, wherein the side wall of said outer pot defines a plurality of recesses in the outer side surface of the cooking pot.

10. The double-walled cooking pot as claimed in claim 9, wherein said recesses are spaced equally about the circumference of the side wall of the inner pot.

11. The double-walled cooking pot as claimed in claim 1, wherein the inner and the outer pots are disposed coaxially.

12. The double-walled cooking pot as claimed in claim 1, wherein, between the bottom and the upper portions of said inner and said outer pots, the side walls of said inner and said outer pots make line contact with one another along lines extending parallel to the central axis of the cooking pot.

13. The double-walled cooking pot as claimed in claim 1, wherein, between the bottom and the upper portions of said inner and said outer pots, the side walls of said inner and said outer pots make point contact with one another at points which lie in lines parallel to the central axis of the cooking pot.

14. The double-walled cooking pot as claimed in claim 1, wherein, between the bottom and the upper portions of said inner and said outer pots, the side walls of said inner and said outer pots make line contact with one another along lines extending helically about the central axis of the cooking pot.

15. The double-walled cooking pot as claimed in claim 1, wherein, between the bottom and the upper portions of said inner and said outer pots, the side walls of said inner and said outer pots make point contact with one another at points which lie in lines extending helically about the central axis of the cooking pot.

16. The double-walled cooking pot as claimed in claim 1, wherein the point or line contact between the side walls of said inner and said outer pots is distributed over substantially the entire height of the cooking pot.

17. The double-walled cooking pot as claimed in claim 1, wherein the point or line contact between the side walls of said inner and said outer pots is distributed generally uniformly over the circumference of the cooking pot.

18. The double-walled cooking pot as claimed in claim 1, wherein said inner and said outer pots comprise different materials.

19. The double-walled cooking pot as claimed in claim 1, wherein the bottom portions of said inner and said outer pots are pressure-welded to one another via said bottom plate of thermally conductive material.

20. The double-walled cooking pot as claimed in claim 1, wherein the upper portion of said outer pot defines an edge, and said discharge rim is unitary with the side wall of said inner pot, said discharge rim extending over and sealing the edge defined at the upper portion of said outer pot.

21. The double-walled cooking pot as claimed in claim 1, wherein said handle is spot-welded to said outer pot.

* * * * *